US007275573B2

(12) United States Patent
Nguyen et al.

(10) Patent No.: US 7,275,573 B2
(45) Date of Patent: Oct. 2, 2007

(54) RADIAL PASSENGER TIRE WITH IMPROVED TREAD CONTOUR

(75) Inventors: Gia Van Nguyen, Rossignol (BE); Sébastien Morin, Bereldange (LU); Anne-France Gabrielle Jeanne-Marie Cambron, Angelsberg (LU); Xavier Sébastien Benoît Fraipont, Vielsalm (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 23 days.

(21) Appl. No.: 10/456,718

(22) Filed: Jun. 6, 2003

(65) Prior Publication Data

US 2004/0244895 A1 Dec. 9, 2004

(51) Int. Cl.
*B60C 11/00* (2006.01)

(52) U.S. Cl. .......................... 152/209.14; 152/209.18; 152/454

(58) Field of Classification Search ........... 152/209.14, 152/209.18, 454
See application file for complete search history.

(56) References Cited

U.S. PATENT DOCUMENTS 5,247,979 A 9/1993 Asano .................... 152/209 R
5,360,044 A 11/1994 Saito et al. ............. 152/209 R
5,526,860 A * 6/1996 Minami ................. 152/209.27
5,616,195 A 4/1997 Marquet et al. ............ 152/209
5,803,999 A 9/1998 Shibata ....................... 152/209
2002/0124928 A1 * 9/2002 Carra et al. ................. 152/523

FOREIGN PATENT DOCUMENTS

EP 0269301 6/1988
EP 0755808 1/1997
EP 1086832 * 3/2001
JP 08-091023 * 4/1996
JP 10100618 7/1998
WO WO99/36278 * 7/1999

OTHER PUBLICATIONS

Machine translation for Japan 10-100618 (obtained May 16, 2007).*

* cited by examiner

*Primary Examiner*—Steven D. Maki
(74) *Attorney, Agent, or Firm*—June E. Bickey

(57) ABSTRACT

A pneumatic radial ply passenger tire (10) having a tread (20), a casing with two sidewalls (14, 16), one or more radial plies (18) extending from and wrapped about two annular beads (13) and a belt reinforcement structure (15) located radially between the tread and the plies. The tread has a first contour-defining curve extending outwards from the equatorial plane of the tire towards the sidewalls, an adjacent second contour-defining curve disposed between the first contour defining curve and the sidewalls and an adjacent third contour defining curve extending outwards from the second contour defining curve and the sidewalls. The first, second and third contour-defining curves have first (R1) and second (R2) and third (R3) radii chosen such that R2>R1>R3.

7 Claims, 4 Drawing Sheets

FIG—1

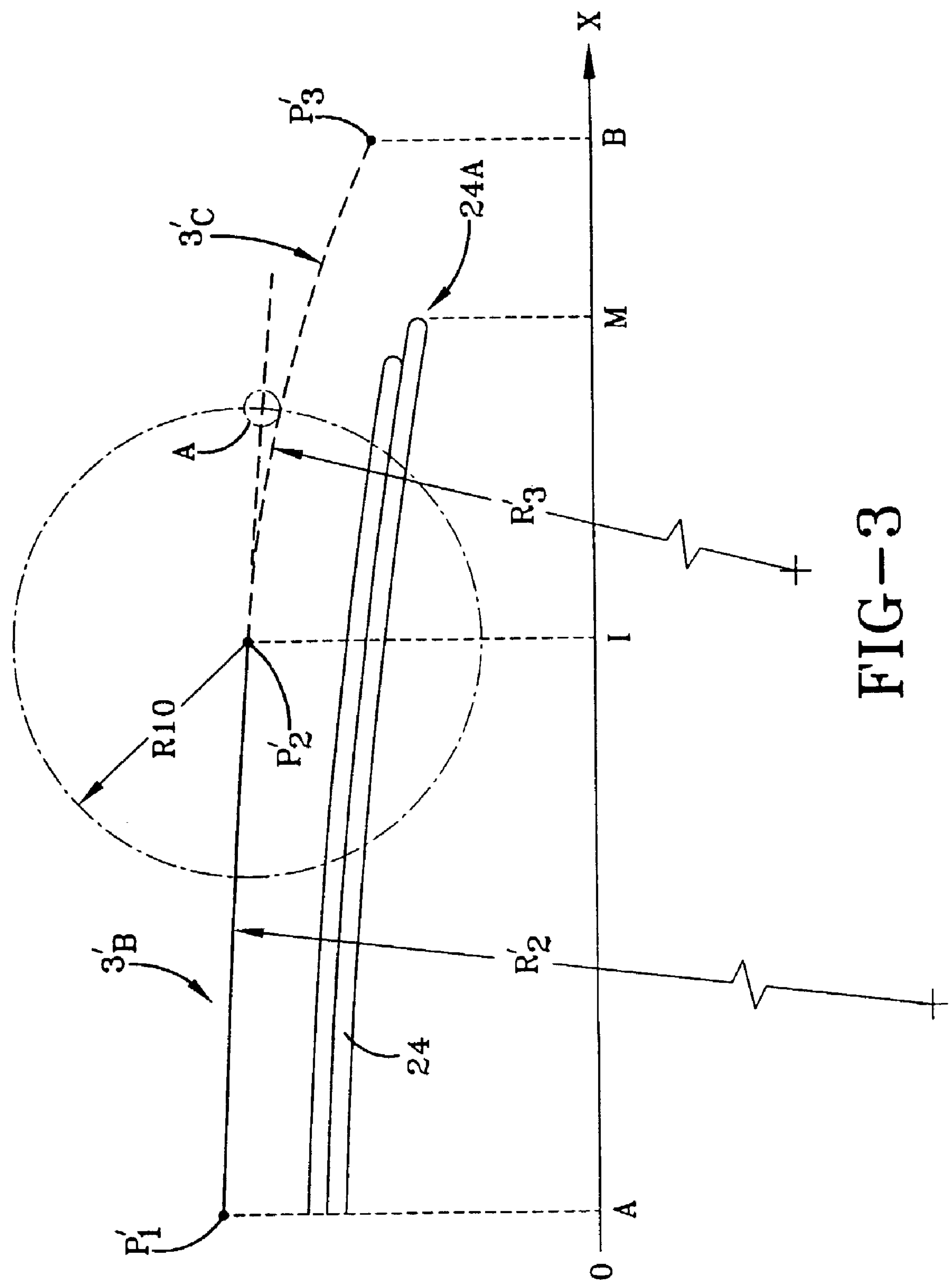
FIG—3

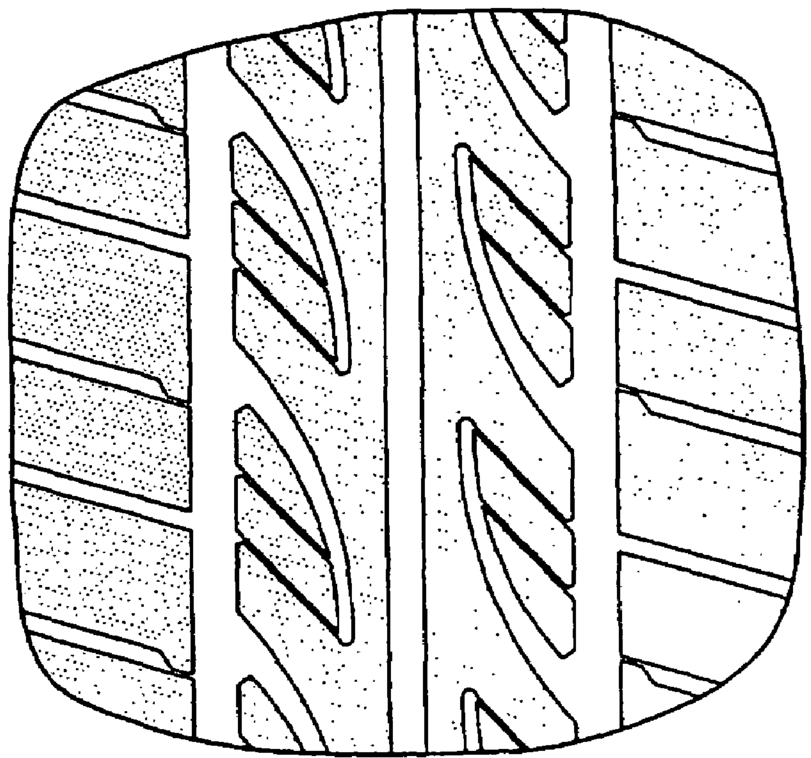
FIG—5
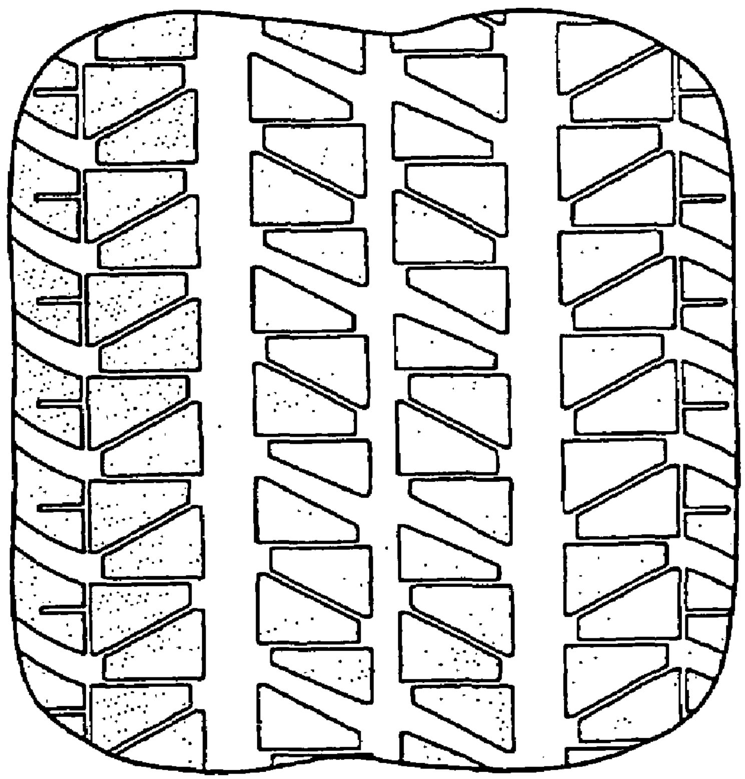
FIG—4
Prior Art

RADIAL PASSENGER TIRE WITH IMPROVED TREAD CONTOUR

FIELD OF THE INVENTION

The invention relates to a tire and more specifically a passenger tire having a specific contour of the radially outer tread area.

BACKGROUND OF THE INVENTION

It is usual to design a passenger tire mold cavity with a profile giving the cured tire a tri-radius crown area. Starting from center line, the first radius has the highest value so as to result in the flattest radially outer tread area in the cured tire. The second radius would permit to reach the necessary mold contour drop at the beginning of the cavity shoulder radius. This second radius has an intermediate value between the first radius and the third radius which is the shoulder radius and which permits a progressive footprint edge and a crown area junction with the tire sidewalls.

When a tire built in such a cavity is loaded on the ground, it is not difficult to flatten the first radius area. The tread portion having the second radius area which is of smaller value will resist more to be flattened to the ground. It will rather have tendency to have a hinge effect by rolling on its curvature like in a rocking chair. The "rocking chair effect" induces a lift-off of the center part and an increase in pressure in the shoulder portions as well as a slippage, which is in fact a lateral displacement in the footprint. The presence of the tire grooves in the circumferential direction will permit to avoid this rocking chair effect; however the proximity of the shoulders which are usually designed with a very low radius and have a high stiffness, will result in shifting the lift-off and the slippage to an area closer to the shoulder.

However, in the current trend to design a tread pattern for ultra high performance (UHP) tires, such circumferential grooves are normally not located in the above mentioned second radius area nor in the low meridional bending stiffness area which is in the center area. The result is an even more pronounced rocking chair effect. If the tire shoulder construction is not carefully designed (high bending stiffness), this rocking chair effect results in a poor pressure distribution. One of the effects will be a tire shoulder slippage which results in irregular wear.

U.S. Pat. No. 5,803,999 discloses a tire with a tread profile comprising a curved crown part having a radius of curvature R1 for its center portion, a pair of curbed middle portions having a radius of curvature R2 and a pair of curved shoulder portions having a radius of curvature R3 which extend continuously without forming any inflection point, wherein R1 ranges between 2 and 3.5 times the tread width TW, and is less than the radius R2 and more than the radius R3. The tread shoulder drop ranges between 0.038 and 0.050 times the tread width.

U.S. Pat. No. 5,616,195 discloses a truck tire wherein the radius R2 equals 1.3 to 2 times R1. Radius R3 equals 0.7 to 2.5 times R1. Radii R1 and R2 are convex whereas R3 is concave.

U.S. Pat. No. 5,360,044 relates to a tire with a tread surface extending along a curvature plane including a first arc with a radius of curvature R1, a second arc R2 intersecting the first arc at an intersection distance from the tire's equatorial plane by 0,2 to 0,25 times the tire width and a third arc with the radius R3 passing through a ground contact outer edge point of the ground contact surface. The curvature radius ratio R1/R2 is set in a range from 1.2 to less than 1.6. The curvature radius ratio R2/R3 is set in a range between 4 and 12.

U.S. Pat. No. 5,247,979 relates to a tire exhibiting improved handling and stability on wet roads where the net to gross is in a range comprised between 0.55 and 0.58. The radius or curvature of the shoulder of the tire R2 and the ratio of curvature of the shoulder edge portion present a ratio R2/R3 comprised between 14 and 20.

An object of the invention is to design a crown area of a tire so that the flattening on the ground can be done without a lift-off and/or a lateral displacement in the footprint. A further object of the invention is to reduce tire shoulder wear. A further object is to reduce heel and toe wear.

SUMMARY OF THE INVENTION

The invention provides a radial pneumatic passenger tire as defined in the claims.

More specifically the invention provides a tire wherein the center line area has a radius ranging from 400 to 900 mm, preferably from 500 to 800 mm. The second radius is greater than the first radius and ranges from 700 to 1300 mm, preferably from 800 to 1200 mm. In such a cavity shape wherein the tread includes circumferential grooves or grooves having a low inclination with respect to the equatorial plane, the tread flattening in the ground is easy in the centerline part due to its low meridional bending stiffness and the high lever effect. The meridional bending stiffness is primarily a function of the number and location of the circumferentially oriented grooves, the breaker layout and the tread thickness and stiffness. The second radius being high, the rocking chair effect is much reduced even under heavy cornering.

The tire shoulders are the crown area parts which have the highest deformation during the tire loading. The bending stiffness should be kept at a minimum level to avoid a tendency to a hinge effect with a high vertical loading and/or with a lateral force. In the invention, it may be considered to provide a third radius adjacent to the second and the shoulder radius which shoulder radius becomes the fourth radius. The third radius introduces a small drop compared to the second radius to attenuate the hinge effect linked to the shoulder deformation. This third radius will range in length between the second radius and the shoulder radius without changing the distribution of the first and the second radii.

As mentioned above, to avoid the "rocking chair effect", the second radius has a high value. However, to reach a certain required drop at the shoulder, the center part must have a low equivalent radius. This equivalent radius is smaller than R2. An equivalent radius is by definition the radius of a circle tangent to R2 at the R2 starting edges. According to the invention, the center part must not be greater than ½ of the tread width (TW) and the equivalent radius must not be lower than 300 mm. However, this low radius parts have to be flattened on the ground. For this reason, it is preferable that this part is decoupled with circumferential grooves. Put in other words, the tread portion defined by radius R2 should preferably be separated from the portion defined by radius R1 by circumferential grooves. If that case, for the center part area, the true R1 doesn't need to be tangent to R2 and R1 may have any value (lower, equal or greater than R2). The center part may be composed of one or two radii (e.g. a flat center rib with two radii both sides to join R2 and separated from the center rib by circumferential grooves).

Definitions

"Apex" means an elastomeric filler located radially above the bead core and between the plies and the turnup ply.

"Aspect Ratio" means the ratio of its section height to its section width.

"Bead" means that part of the tire comprising an annular tensile member wrapped by ply cords and shaped, with or without other reinforcement elements such as flippers, chippers, apexes, toe guards and chafers, to fit the design rim.

"Belt Structure" or "Reinforcing Belts" means at least two annular layers or plies of parallel cords, woven or unwoven, underlying the tread, unanchored to the bead, and having both left and right cord angles in the range from 17 degrees to 27 degrees with respect to the equatorial plane of the tire.

"Casing" means the carcass, belt structure, beads, sidewalls, and all other components of the tire excepting the tread and undertread. The casing may be unvulcanized rubber or previously vulcanized rubber to be fitted with a new tread.

"Chafers" refers to narrow strips of material placed around the outside of the bead to protect cord plies from the rim, distribute flexing above the rim, and to seal the tire.

"Circumferential" means lines or directions extending along the perimeter of the surface of the annular tread perpendicular to the axial direction.

"Cord" means one of the reinforcement strands of which the plies in the tire are comprised.

"Lateral" means an axial direction.

"Ply" means a continuous layer of rubber-coated parallel cords.

"Radial" and "radially" mean directions radially toward or away from the axis of rotation of the tire.

"Radial Ply Tire" means a belted or circumferentially-restricted pneumatic tire in which the ply cords which extend from bead to bead are laid at cord angles between 65 degrees and 90 degrees with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge, tread shoulder or shoulder rib means that portion of the tread near the shoulder.

"Sidewall" means that portion of a tire between the tread and the bead.

"Tread" means that portion of the tire that comes into contact with the road under normal inflation and load.

"Tread width (TW)" means the arc length of the tread surface in the axial direction, that is, in a plane passing through the axis of rotation of the tire.

BRIEF DESCRIPTION OF THE DRAWINGS

Similar elements throughout the drawings may be referred to by similar references numerals where an "'" has been added. For example, the element 3B in a figure (or embodiment) may be similar in many respects to the element 3B' in an other figure (or embodiment). Such a relationship, if any, between similar elements in different figures or embodiments will become apparent throughout the specification.

FIG. 3 shows an outline of an enlarged portion of a further embodiment of the invention showing in detail the cross section of a tread contour close to the tire shoulder;

FIG. 4 is an exemplary illustration of a tire footprint of a prior art radial tire exhibiting a square shape with a tendency to a butterfly shape; and FIG. 5 is an exemplary illustration of the footprint of the preferred embodiment tire as represented in FIG. 1.

DETAILED DESCRIPTION OF THE INVENTION

Figure 1:
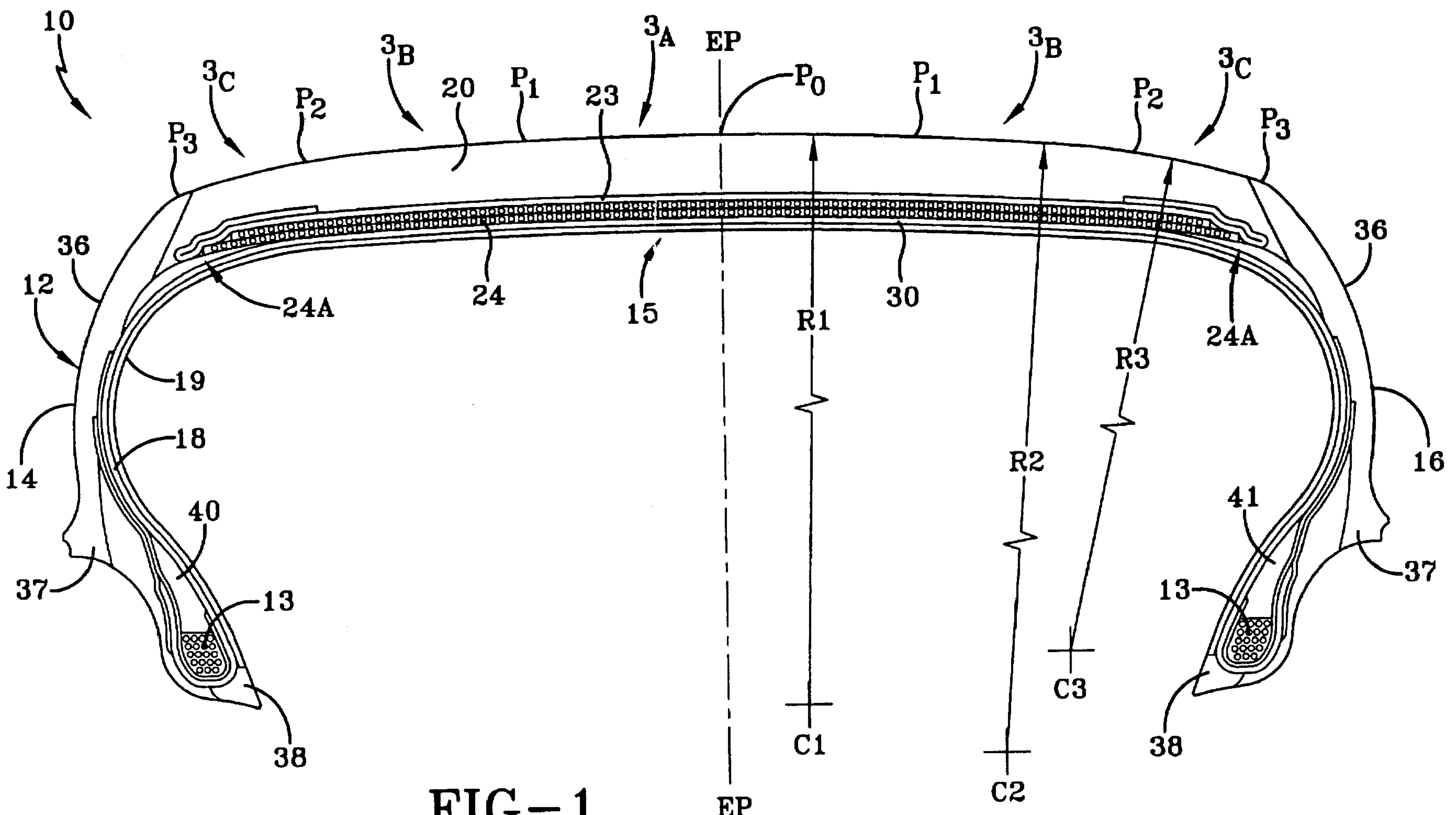
FIG. 1 is a cross sectional view of the preferred embodiment tire according to the invention.

With reference to FIG. 1, a cross section of the pneumatic radial tire 10 for use in passenger vehicles is illustrated, showing the invention. The tire 10 has a tread 20 and a casing 12. The distance halfway between the axially outer edges of the tread 20, as shown in FIG. 1, defines the centerline of the tread 20 or equatorial plane EP of the tire. The casing 12 has two sidewalls 14,16, one or more radial plies 18 extending from and wrapped about two annular beads 13, and belt reinforcement structure 15 located radially between the tread 20 and the plies 18. The belt reinforcing structure is as represented in FIG. 1, comprised of two belt plies 24 having laterally extending ends 24A close to the shoulders of the tire 10 and an overlay 23. As well known to the man skilled in the art such an overlay is obtained by helically winding during tire building a single flat strip of cord reinforced material radially outward on of the belt plies 24. The carcass plies 18 and the belt reinforcement structure 15 are made of cord-reinforced elastomeric material; the cords are preferably steel cord for the belt plies 24 and textile cord for the carcass ply or plies 18 and for the overlay 23. Similarly, the annular beads 13 have steel wires wrapped into a bundle also known as the bead core.

The carcass 30 includes the inner liner 19, the plies 18, sidewalls 14,16, the beads 13, and a pair of apexes 40 and 41 located over the beads 13 and between the plies 18 that are folded around the beads 13. This carcass structure 30 is the foundation upon which, and contiguous with, the tread 20 resides.

The liner component 19 of preferably halobutyl rubber is air-impervious and seals the pressurized air in tire 10. A pair of annular shaped wheel-rim retainer lips 37 retain the tire on the rim and protect the rim against damage. The chafers 38 protect the cord plies from the rim and distribute flexing above the rim.

Several circumferentially extending grooves are located on each side of the equatorial plane EP and define with laterally extending grooves a multiplicity of ground contacting elastomeric blocks (not represented). More or less grooves may be used depending on the width of the tread and other design considerations.

The radially outer tread surface has a maximum diameter D at the equatorial plane and is defined by a substantially constant radius of curvature R1 extending laterally outwardly from the equatorial plane when the tire is inflated to its nominal pressure. The radius of curvature R1 has according to the invention a length comprised between 400 to 900 mm, preferably from 500 to 800 mm. Its center C1 is substantially on the equatorial plane and extends from a point P0 on the equatorial plane of the tread to a point P1 on each tread half located in the range of between 25% and 50% of half the treadwidth TW from P0 defining thereby a first radially outer convex tread surface 3A.

As further shown in FIG. 1, at the point P1 located on each half of the tread 20, the curvature of the radially outer tread surface changes wherein the tread surface is defined by a second radius of curvature R2, also originating internally to the tire 10. The second radius of curvature R2, having its center C2 on the equatorial plane or not, extends from the point P1 to a point P2 located in the range of between 70% and 90% of half the treadwidth from P0 defining thereby a second radially outer convex tread surface 3B when the tire is inflated to its nominal pressure. The second radius is greater than the first radius and ranges from 700 to 1300 mm, preferably from 800 to 1200 mm about 1000 mm being most preferred.

A third radius of curvature R3 has its center C3 located also internally to the tire but not on the equatorial plane and extends from the point P2 towards the tread edge, cutting the curve defining the shoulder of the tire and connecting the sidewall to the tread. This shoulder defining curve may have a single radius of curvature comprised between 20 and 30 mm and is not critical for the instant invention.

The third radius of curvature R3 defines a third radially outer convex tread surface 3C and has a radius comprised between 130 and 200 mm and preferably between 150 and 180 mm.

The combination of the radially outer surfaces 3A, 3B, and 3C define a contour as shown in FIG. 1 wherein the contour is represented as a line 3 extending continuously across the crown portion of the tire. As said above, the tread comprises grooves which are not represented on FIG. 1 which grooves define elastomeric blocks. The grooves have a radial depth extending from the surface 3 to the base of the grooves.

The tire 10 preferably has a relationship between the first, second and third radii of curvatures such that the second radius of curvature R2 is in the range of 1.5 to 2.5 times preferably about 2 times the first radius of curvature R1 and the third radius of curvature R3 is in the range of 0.1 to 0.5 times the second radius of curvature R2, preferably 0.2 to 0.4 times R2. Preferably the third radius of curvature R3 is in the range of 0.25 to 0.35 times the second radius of curvature R2. The radii are preferably oriented such that the adjacent portions of the tread contour are tangent. Should this not be the case for R1 and R2, the two tread portions 3A and 3B are preferably separated by a groove. The second radius of curvature and the third radius of curvature must be tangent, the tread portions 3B and 3C may not be separated by a groove.

Figure 2:
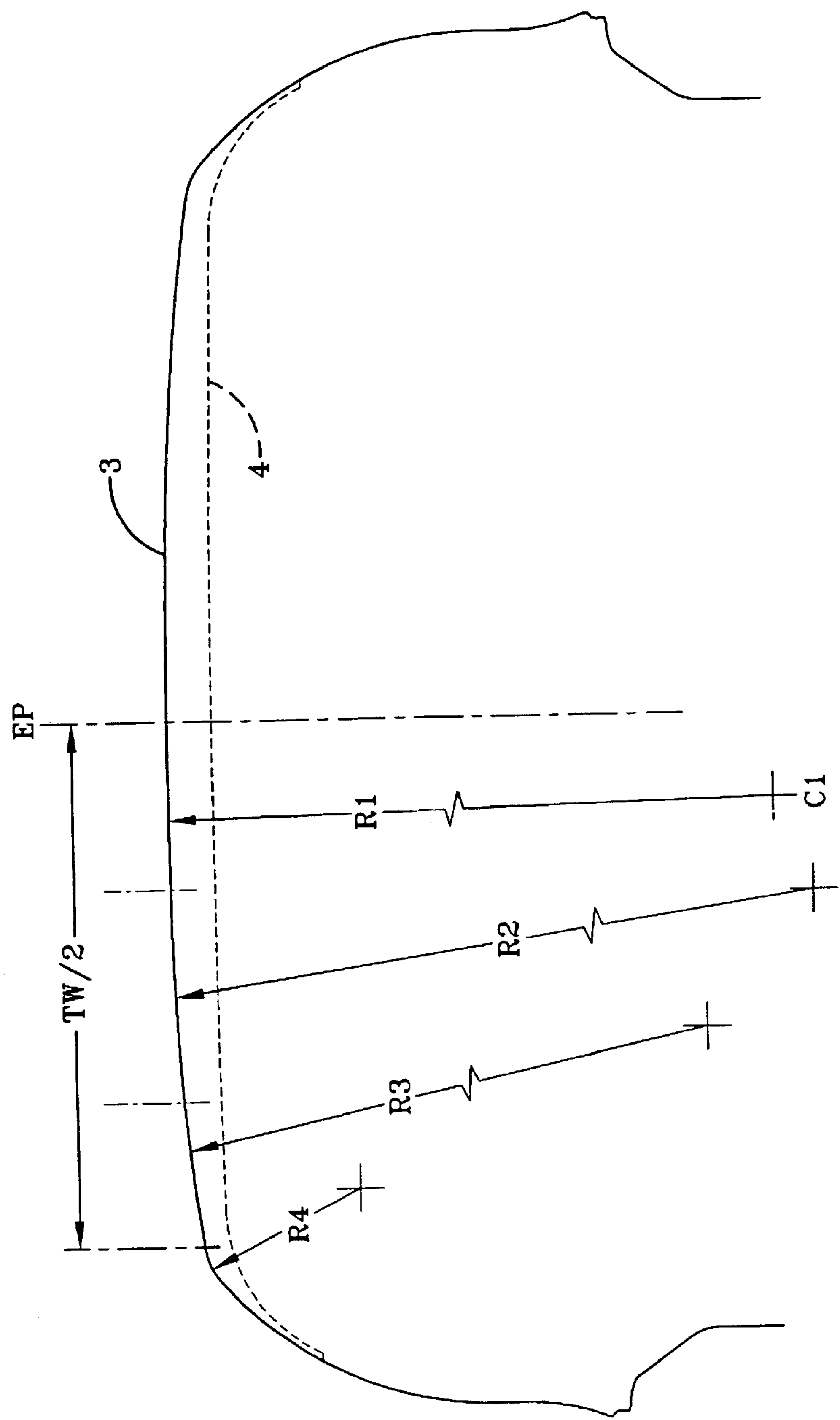
FIG. 2 is a schematic cross section of a tire mold according to the invention.

Referring now to FIG. 2 there is represented schematically a cross section of a tire mold according to the invention. The different radii R1, R2, R3, and R4 can be distinguished. The curve defining the shoulder of the tire and connecting the sidewall to the tread is in this case one constant radius R4. Reference 3 points to the outer contour of the tire which is ground contacting and reference 4 to outline of the maximum radial depth the different block defining grooves (not represented) may have.

In a further embodiment of the invention the dry braking performance and the cornering stability are improved with an increase of contact pressure of a part of the footprint, the braking force per surface unit being more or less proportional to the footprint pressure. The idea is based on the fact that a bending of a stiff and skew surface against a flat ground generates an increase of contact pressure. However, it is important that this pressure increase occurs only during the braking or lateral acceleration of the car. In normal running conditions, the high pressure in a part of the footprint may lead to irregular wear and to handling issues. The shoulder layout is tuned so that the skew surface will not generate a high footprint pressure in the normal running conditions. Only the overloading produced by braking or by lateral acceleration will generate a bending of this skew surface, leading to an increase of the contact footprint pressure with the ground resulting in an increased tire grip. In order to obtain this effect, radii R2 and R3 must have specific relationships and radius R3 a specific length.

Referring to FIG. 3 there is represented an outline of an enlarged portion of this further embodiment of the invention showing in detail the cross section of a tread contour close to the tire shoulder. This shoulder tread contour can be implemented with advantage in a tire as represented in, and disclosed in connection with FIG. 1, as well as in other tires which do not have the described ratios of the radii R1 and R2. The skew surface is represented by the radially outer contour of the tire section. This contour must have a profile including two tread contour defining curves 3B' and 3C' which are tangent one with the other at point P2'. The radius R2', determining second contour defining curve 3B' is superior or equal to 700 mm and preferably in the range of 800 to 1,200 mm. The third contour defining curve 3C' is tangent to the second curve 3B' and to a small circle A of which the center is on the extension of the second curve 3B' of radius R2' at a distance of 10 mm from the edge P2' which as said above is the tangent point between second curve 3B' and third curve 3C'-see also circle RIO having its center on P2' and a radius of 10 mm-. The radius of the small circle A ranges from 0.1 mm to 0.8 mm and is preferably between 0.2 and 0.5 mm. Put in the words of the man skilled in the art, there is a drop of 0.1 mm to 0.8 mm at a distance of 10 mm laterally outward of tangent point P2' of second and third contour defining curves 3B' and 3C'.

The third contour defining curve 3C' is determined by another arc of circle with radius R3' at least up to the tangent point with the small circle A. Alternatively the third contour defining curve may be continued laterally outward of said tangent point with the small circle A and outward to the tread edge P3', by a substantially flat portion or by another curve. The spacing of tangent point P2' to the neighboring tread edge P3' is at least 15 mm, preferably 20 to 40 mm.

References A, I and B point to the projections on an axial line OX of respectively the edges P1' and P2' of the second curve 3B', the edges P2' and P3' of the third curve 3C'. Reference M points to the projection on the axial line OX of the lateral outer edge 24A of the belt plies 24. The distance between projected points A and I must be greater than 1.1 times the distance between projected points I and B, preferably about two 2 times the distance between points I and B. It is furthermore important that projected point I is located within 75 to 100% and preferably between 80 and 95% of the distance spacing the equatorial plane EP from the projected point M of the lateral outer belt edge 24A.

In order to obtain the technical effect described in this embodiment, the tread portion within reach of the circle RIO and its close neighborhood may not be cut be a circumferentially extending groove; generally, the farther the circumferential grooves are spaced from the intersection point P2', the less their detrimental effect. Put in other words, it is believed that part of the technical effect may still be obtained if there are small narrow grooves or slots not too close to the intersection point P2'. By groove is meant here an elongated void area having a width exceeding 1 mm.

FIG. 4 is an exemplary illustration of a tire footprint of the prior art radial tire exhibiting a tendency to the butterfly shape.

The tire 10 according to the invention, when statically loaded exhibits a footprint as illustrated in FIG. 5. As shown the footprint is substantially rectangular with the leading and trailing edges being convex.

What is claimed is:

1. A pneumatic radial ply passenger tire inflated to its nominal pressure, the tire having a tread, a casing with two sidewalls, one or more radial carcass plies extending from and wrapped about two annular beads and a belt reinforcing structure located radially between the tread and the carcass plies, the tread having a first contour-defining curve extending outwards from the equatorial plane of the tire towards the sidewalls, a second contour-defining curve disposed between the first contour defining curve and the sidewalls; and a third contour defining curve disposed between the second contour defining curve and the sidewalls;

the first and second contour-defining curves each having respectively first R1 and second R2 radiuses such that the length of the first radius R1 ranges from 400 to 900 mm; and the length of the second radius R2 is greater than the first radius and ranges from 700 to 1300 mm, the third contour-defining curve having a radius R3, wherein the third radius R3 ranges between 130 and 200 mm, and wherein the second radius (R2) and the third radius (R3) are tangent to each other at a point P2, the tangent point P2 being spaced from the tread edge by a distance of 20 to 40 mm, and wherein there is neither a circumferentially extending groove nor a circumferentially extending elongated void area located within a radius of 10 mm of said point P2.

2. The pneumatic radial ply passenger tire of claim 1 wherein the first radius R1 ranges from 500 to 800 mm.

3. The pneumatic radial ply passenger tire of claim 1 wherein the second radius R2 ranges from 800 to 1200 mm.

4. The pneumatic radial ply passenger tire of claim 1 the third radius R3 ranges between 150 and 180 mm.

5. The pneumatic radial ply passenger tire of claim 1 wherein the third contour defining curve is tangent to the second contour defining curve and to a small circle A of which the center is on the extension of the second contour defining curve of radius R2 at a distance of 10 mm from an edge P2' defining the point of tangency of the second and third contour defining curves, the radius of the small circle A ranging between 0.1 mm to 0.8 mm.

6. The pneumatic radial ply passenger tire of claim 1 wherein the third contour defining curve is tangent to the second contour defining curve and to a small circle A of which the center is on the extension of the second contour defining curve of radius R2 at a distance of 10 mm from an edge P2' defining the point of tangency of the second and third contour defining curves, the radius of the small circle A ranging between 0.2 and 0.5 mm.

7. The pneumatic radial ply passenger tire of claim 1 wherein a curve defining the shoulder of the tire and connecting the sidewall to the tread has one constant radius.

* * * * *